United States Patent [19]

Perego

[11] Patent Number: 5,785,489
[45] Date of Patent: Jul. 28, 1998

[54] CASE-FEEDING UNIT IN AN AUTOMATIC APPARATUS FOR PACKAGING MANUFACTURED ARTICLES INTO CASES AND AUTOMATIC CASE-FEEDING METHOD RELATING TO SAME

[75] Inventor: Luciano Perego, Milan, Italy

[73] Assignee: Tapematic U.S.A., Inc., Orlando, Fla.

[21] Appl. No.: 589,947

[22] Filed: Jan. 23, 1996

[51] Int. Cl.⁶ ..................................................... B65G 59/06
[52] U.S. Cl. .......................... 414/795.8; 221/11; 414/786
[58] Field of Search ...................... 221/6, 11; 414/795.8, 414/786, 790.3, 797.4, 798.1

[56] References Cited

U.S. PATENT DOCUMENTS 3,027,021  3/1962  Kramer ............................ 414/795.8 X
5,096,371  3/1992  Mojden et al. ......................... 221/11 X

FOREIGN PATENT DOCUMENTS 0725006  8/1996  European Pat. Off. .

*Primary Examiner*—Janice L. Krizek
*Attorney, Agent, or Firm*—Edgar H. Haug; Frommer Lawrence & Haug, LLP

[57] ABSTRACT

In an automatic apparatus for packaging compact discs into respective cases, the empty cases are arranged within a feeding magazine in a mutually superposed relation so as to form a vertical stack from the bottom of which the cases are individually removed for conveyance to the subsequent packaging steps. A new case stack is manually arranged on a platform located in front of an entrance side of the feeding magazine and, by means of a pusher member controlled by a fluid-operated actuator, the new stack is transferred into the feeding magazine so as to instantaneously replace the case stack previously in the magazine when the case stack is exhausted or the height of the cases in the stack falls below a predetermined level.

17 Claims, 2 Drawing Sheets

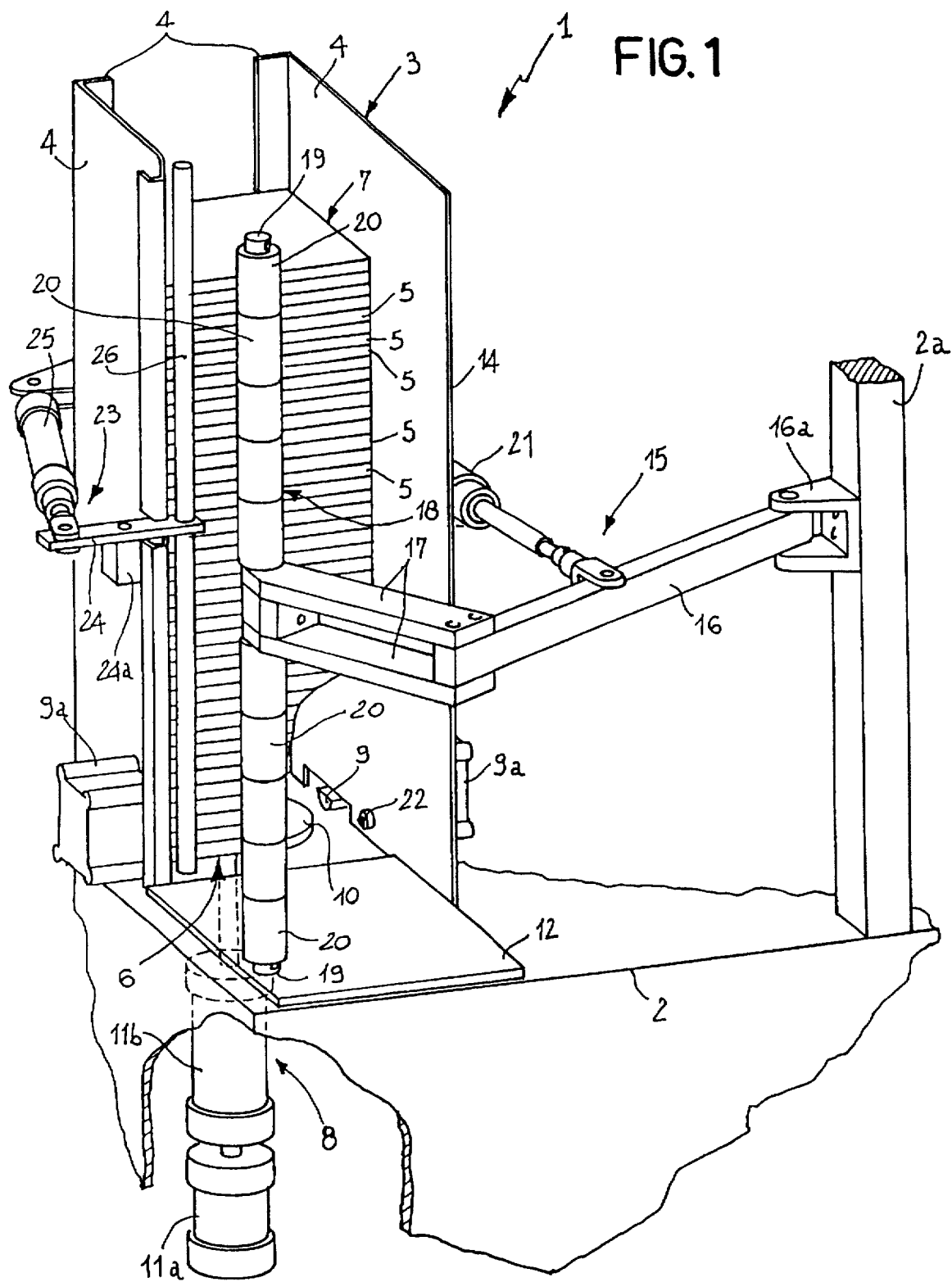

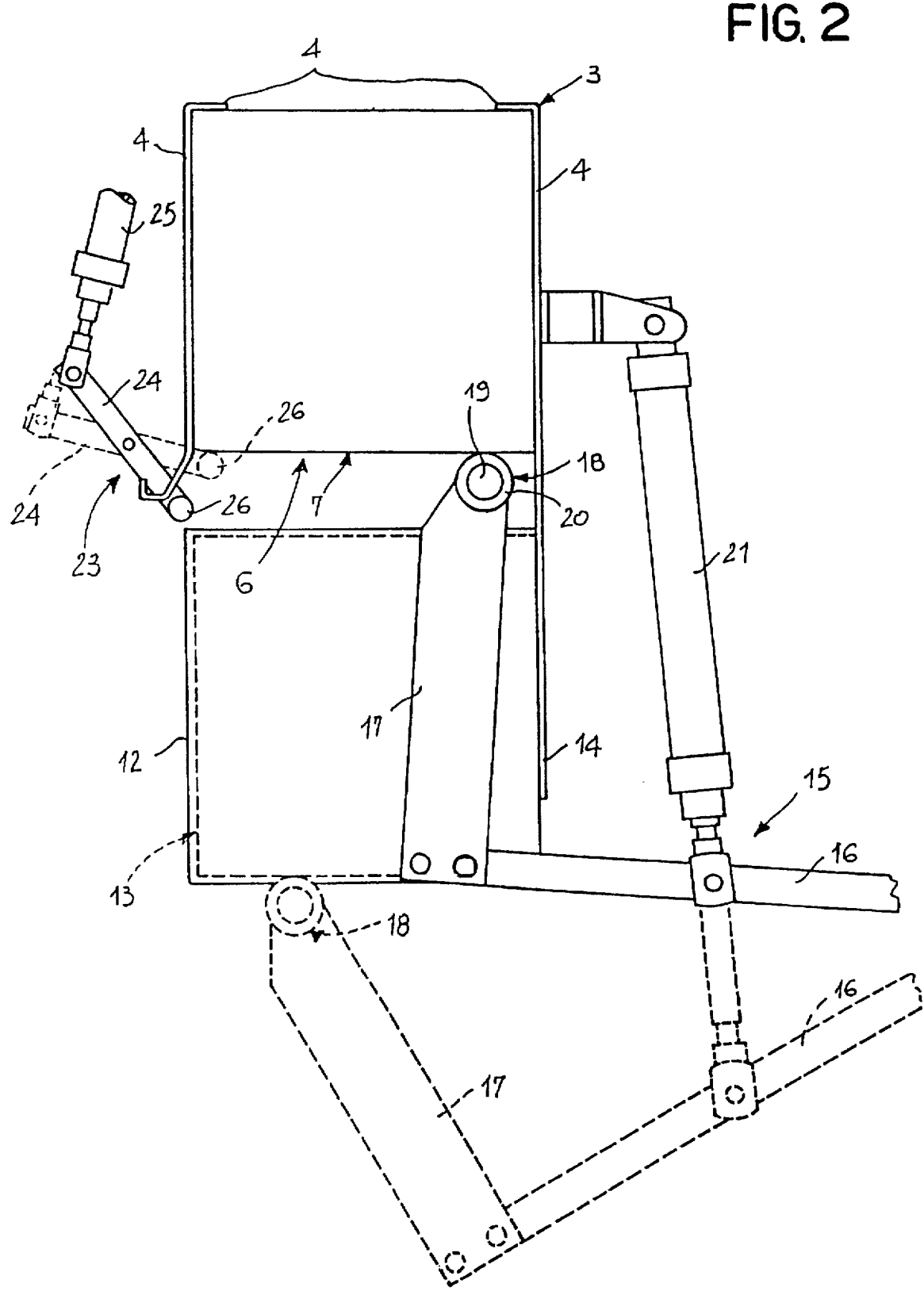

CASE-FEEDING UNIT IN AN AUTOMATIC APPARATUS FOR PACKAGING MANUFACTURED ARTICLES INTO CASES AND AUTOMATIC CASE-FEEDING METHOD RELATING TO SAME

FIELD OF THE INVENTION

The present invention relates to a case-feeding unit in an automatic apparatus for packaging manufactured articles into cases, and also relates to an automatic case-feeding method for packaging manufactured articles into cases.

In particular, the case-feeding unit of the present invention sequentially supplies plastic cases for use with automatic apparatus for packaging compact discs into those cases.

In addition, the present invention may be utilized for feeding the same compact disc packaging apparatus with trays, or with cases containing the compact discs. In the alternative, the present invention may be utilized for feeding tape cassettes to an apparatus for sealing the cassette cases with a plastic film.

BACKGROUND OF THE INVENTION

Optical discs, usually referred to as compact discs and used for recording sounds and images and/or storing data for computers, are generally packaged into appropriate box-shaped cases formed of plastic material. The packaging operation is performed by means of apparatus operating in a completely automatic manner. Such apparatus receives the individual cases from a feeding station and causes the cases to progress according to a stepping motion along a feed line which has a plurality of work stations distributed thereon. Each of the work stations is designed to perform a particular operating step during the packaging cycle. More particularly, the work stations provided along this apparatus include a case-opening station, one or more work stations for introducing at least one compact disc and a tray, if necessary, into the case, one or more auxiliary work stations for introducing informational booklets, covers or the like into the case, and a final case-closing station.

In designing the above apparatus, efforts have been directed to increase the productivity and automation of same, while minimizing the operators' interventions for periodically supplying the different work stations with the components which are to be introduced into the cases. In addition to these objectives, efforts have been made to reduce the bulkiness of the apparatus as much as possible.

Based on the foregoing, one type of case-feeding unit normally used in packaging apparatus of the above type, is described in the European Patent Application No. 95830022.0 in the name of the same applicant as this application. In the case-feeding unit of European Patent Application No. 95830022.0, a feeding magazine is composed of three vertically-extending walls disposed consecutively to form a U-shaped profile. Between the ends of this U-shaped profile, an entrance side is provided through which vertically stacked empty cases can be introduced into the magazine.

The feeding unit is also provided with an appropriate case separation mechanism operating adjacent to the lower end of the feeding magazine so that the individual cases can be received from the end portion of said stack which becomes increasingly shorter as the cases are removed to be transferred along the feed line of the packaging apparatus.

When the case stack is exhausted or close to exhaustion, the operator must introduce a new case stack into the magazine in order to continue to supply the packaging apparatus with cases.

For obvious practical reasons connected with handling, the case stacks cannot exceed a predetermined height. As a result thereof, the magazine capacity is closely correlated with the maximum height of the stack being utilized as it is virtually impossible to position several stacks in the feeding magazine for practical reasons. For example, it has been found that the magazine capacity cannot be of a capacity greater than about 60–80 cases. Considering the production rates of current packaging apparatus, such a threshold capacity enables an automatic operation which does not require loading of a new stack for only approximately two minutes.

In many cases, this time limit appears to be insufficient to allow an operator to dispose a new case stack in the feeding magazine when needed. In fact, it often happens that just when the two minutes have elapsed, the operator is executing loading of other components such as trays, compact discs, booklets, covers or the like, in one or more of the apparatus work stations.

It is readily apparent that when the cases in the feeding magazine are exhausted, the packaging apparatus will stop production.

OBJECTS AND SUMMARY OF THE INVENTION

Therefore, it is an object of the present invention to provide a case feeding unit in an automatic apparatus for packaging manufactured articles into cases which avoids the disadvantages noted with respect to the prior art.

It is also an object of the present invention to provide a case feeding unit which conveniently enhances the automatic character of such case feeding units without increasing bulkiness or practical problems attendant to loading new stacks of cases into the feeding unit.

The foregoing and further objects are achieved by a case-feeding unit in an automatic apparatus for packaging manufactured articles into cases of the present invention which includes a feeding magazine having vertical holding walls and arranged to contain a plurality of cases disposed vertically in the form of a stack. A case separation mechanism is also provided in the case-feeding unit of the present invention operating adjacent to a lower end of the feeding magazine to receive the cases sequentially from the stack. A base platform supports a new case stack to be loaded into the feeding magazine. A transferring mechanism operating adjacent to the base platform introduces the new case stack into the feeding magazine by horizontally moving the new stack through an entrance side of the feeding magazine defined between the holding walls. A sensor is associated with the feeding magazine to actuate the transferring mechanism when the height of the stack of the feeding mechanism falls below a predetermined level.

Still in accordance with the present invention, a method of automatically feeding cases into an automatic apparatus for packaging manufactured articles into cases is provided. In this method, a plurality of cases disposed in the form of a vertically extending stack are introduced into the magazine. Each case is individually removed from the bottom of said stack. A new case stack is placed on the base platform in front of an entrance side of the feeding magazine and this new case is horizontally moved through the entrance side so as to be received in the feeding magazine, when the height of the stack in the magazine falls below a predetermined level.

Various other objects, advantages and features of the present invention will become readily apparent from the ensuing detailed description and the novel features will be particularly pointed out in the appended claims.

BRIEF DESCRIPTION OF THE DRAWINGS

The following detailed description, given by way of example, will best be understood in conjunction with the accompanying drawings in which:

FIG. 1 is a front perspective view illustrating a preferred embodiment of a case feeding unit associated with an apparatus for packaging compact discs into corresponding cases in accordance with the teachings of the present invention;

FIG. 2 is a diagrammatic top plan view specifically illustrating the movement of the transferring mechanism and the retaining mechanism of the case feeding unit of FIG. 1.

DESCRIPTION OF THE PREFERRED EMBODIMENT

Referring now to the drawings, wherein like reference numerals are used throughout and in particular to FIG. 1, there is illustrated a preferred embodiment of a case-feeding unit for use in conjunction with an automatic apparatus for packaging manufactured articles into cases in accordance with the present invention which has been generally identified by reference numeral 1.

In the embodiment illustrated in FIG. 1, the feeding unit 1 is mounted to a bearing framework 2 and is used in conjunction with automatic apparatus for packaging compact discs (not shown). One example of a representative packaging apparatus is described in European Patent Application No. 95830022.0 in the name of the same applicant, the disclosure of which is incorporated herein by reference.

The feeding unit 1 includes a feeding magazine 3 comprising at least three vertical holding walls 4 in a substantially U-shaped profile corresponding to the perimetric shape of the cases 5 which are to be introduced into the magazine through an entrance side 6 defined between the opposite ends of the U-shaped profile (i.e., within the holding walls 4).

The cases 5 contained in the feeding magazine 3 are vertically disposed upon each other in the form of a stack, generally identified by 7, with the bottom case of the stack being removed one by one and conveyed to the different work stations arranged along the packaging apparatus.

As is described below, the bottommost case in the stack is removed from the feeding mechanism by an appropriate case separation mechanism. In the illustrated embodiment, the case separation mechanism 8 generally includes a pair of stop elements 9 disposed at opposite positions at the bottom of the feeding magazine 3. These stop elements 9 are movable, upon command of respective air cylinders 9a, towards the inside of the magazine itself to block and support the stack 7 by retaining the lowermost case 5. The case separation mechanism 8 also includes a lifting plate 10 which is disposed under the stack 7 being processed and is vertically movable upon command of respective first and second lifting actuators 11a, 11b operatively connected in series with respect to each other.

When a case 5 is to be removed from the magazine 3, the case separation mechanism 8 is activated and the lifting plate 10, through the actuation of both lifting actuators 11a, 11b, is brought into contact relationship with the lower surface of said case. Then, after the case has been released by the stop elements 9, the first lifting actuator 11a is actuated to cause the lowering of the lowermost case and the simultaneous descent of the whole stack 7 in the magazine by an amount corresponding to the case height. Then the second lifting actuator 11b is actuated in order to separate the case 5 from the stack 7, which stack is retained by the stop elements 9 which are moved inwardly to abut the sides of the new case 5 positioned lowermost in the stack in abutting relationship therewith.

Once the lifting plate 10 has reached its lower stop limit, the case 5 removed from the stack 7 is in a position to be engaged by transporting mechanism (not shown) to be placed in a position to progress step-wise along the packaging apparatus in order to be submitted to the different steps provided for packaging compact discs.

In accordance with the present invention, a base element comprising, for example, a loading platform 12 defining a horizontal rest surface is positioned in front of the entrance side 6 of the magazine 3 adjacent to the lower portion of the magazine 3. The loading platform 12 is adapted to receive a new case stack, generally denoted by 13, which is manually placed on the platform.

An abutment wall 14 is formed as an extension of one of the holding walls 4 to provide an abutment surface for the precise alignment of the new stack 13 which is manually placed on the loading platform 12 by the operator.

In addition, a transferring mechanism, generally identified by 15, which operates adjacent to the loading platform 12, is designed to convey the new case stack 13 located on the loading platform to the feeding magazine 3, by horizontally translating or moving the new case stack 13 through the entrance side 6. This transferring mechanism 15 preferably comprises one movement arm 16 hinged about a vertical axis on a bracket 16a fastened to a post 2a generally vertically supported from the bearing framework 2. The side of the movement arm 16 opposite to the end of the arm hinged to the bracket 16a, has a portion extending transversely in cantilevered fashion therefrom, in the direction of the feeding magazine 3.

A pusher member 18 is connected to the free end of the extension portion 17 and is of a vertical height at least equal to the height of the new case stack 13 arranged on the loading platform 12. In particular, the pusher member 18 preferably comprises at least one central support bar 19 supported, at its mid-section of its longitudinal direction, to the free end of the extension portion 17. A plurality of contact rollers 20 are rotatably engaged along the central support bar in a mutually superposed position.

One fluid-operated actuator 21 acting on the movement arm 16 causes a displacement of the pusher member 18 between a first position, wherein, as shown in FIG. 1 and in dotted line in FIG. 2, the pusher member 18 is spaced apart from the entrance side 6 of the feeding magazine 3, and a second position, wherein, as shown in solid line in FIG. 2, the pusher member 18 is disposed at the entrance side of the magazine to move the new case stack 13 in abutment against the vertical wall 4 of the magazine 3 opposite to the entrance side 6.

Activation of the first fluid-operated actuator 21 occurs upon command of a sensor mechanism comprised for example of photoelectric cells 22 disposed adjacent to a lower portion of the feeding magazine 3. These photoelectric cells actuate the transferring mechanism 15 when the stack 7 in the magazine 3 is exhausted or close to exhaustion. More specifically, when the height of the stack in the magazine, following the progressive removal of cases 5 from the magazine 3, falls below a predetermined level, insertion of the new stack 13 into the magazine 3 will be performed.

Advantageously, the arrangement of the contact rollers 20 on the pusher member 18 eliminates all risks of damage to the cases 5 and/or malfunction when the new stack 13 is being conveyed into the magazine 3 due to the unavoidable relative sliding of the contact point of the pusher member 18 along the sides of cases 5.

The feeding unit further comprises a retaining mechanism 23 selectively movable between a rest condition, wherein the retaining mechanism 23 is spaced apart laterally from the entrance side 6 of the feeding magazine 3 to permit access of the new case stack 13 into the magazine, and an operating condition, wherein the retaining mechanism is moved adjacent to the entrance side 6 to stabilize the positioning of the stack 7 being processed within the feeding magazine. More particularly, the retaining mechanism 23 preferably comprises at least one auxiliary arm 24 connected, about a vertical axis, to a corresponding engagement bracket 24a secured remote from the feeding magazine 3. The auxiliary arm 24 is movable about a corresponding hinging point upon command of an auxiliary actuator 25. A vertical abutment bar 26 is provided at an end of the auxiliary arm 24 which, following operation of the auxiliary actuator, is selectively moved between a start position, wherein, as shown in solid line in FIG. 2, the abutment bar 26 is laterally moved away from the feeding magazine, thereby enabling access of the new stack 13 through the entrance side 6, and a work position, wherein, as shown in dotted line in FIG. 2, the abutment bar 26 is moved in abutment relation with respect to the stack 7 contained in the feeding magazine thereby assisting in stably positioning the stack 7 within the magazine. In this manner, the risk that one or more cases 5 may slip upon each other and be inadvertently removed from the magazine through the entrance side 6 thereof is substantially eliminated.

Operation of the above-described feeding unit is as follows.

When the packaging apparatus is operating in a normal manner, the case separation mechanism 8 removes the individual cases 5 from the stack 7 in the magazine, and in turn, the height of the stack will progressively decrease. During this step, the abutment bar 26 is maintained in its work position, the pusher member 18 is held in its first position spaced from the entrance side of the magazine, and a new stack 13 can be manually placed on the loading platform 12.

When the cases 5 within the magazine 3 are exhausted, or when the height of the stack in the magazine falls below a predetermined level, the photoelectric cells 22 cause the activation of the auxiliary actuator 25 to thereby move the abutment bar 26 to its start position, and also activate the first fluid-operated actuator 21 to displace the pusher member 18 towards the second work position adjacent to the entrance side of the magazine. Consequently, the new case stack 13 will be moved horizontally through the entrance side 6 and, as a result thereof, introduced into the feeding magazine 3 to enable removal of the individual cases 5 by the case separation mechanism 8.

In the embodiment described, in which activation of the first fluid-operated actuator 21 occurs when the stack 7 is exhausted or the height of the stack falls below a predetermined level, the lifting plate 10 during the transferring step of the new stack 13 is maintained in a raised position substantially flush with the loading platform 12 to slidably support the new stack 13 which is being pushed into the magazine 3 by the pusher member 18.

When transferring of the new stack 13 into the magazine has been completed, the abutment bar 26 is returned to its work position and the pusher member 18 is brought to its first work position remote from the entrance side of the magazine, to enable arrangement of a new case stack 13 on the loading platform 12.

As a result of the design of the present invention, this case feeding unit has an automatic feeding operation which lasts twice as long as compared with the conventional case feeding units. Therefore, the present case feeding unit alleviates the problems associated with repeated stoppage of the production line when the cases in the feeding magazine are exhausted and the operator is not ready to supply the magazine with a new stack of cases.

In fact, the present invention enables the operator to arrange a new stack of cases on the loading platform as soon as a stack being processed has been introduced into the feeding magazine.

As a result, the maximum lapse of time that may pass between the loading of two new consecutive stacks in the magazine includes the time during which the new case stack is positioned on the loading platform as well as the time during which this case stack, after being transferred to the magazine following exhaustion of the preceding case stack, is exhausted.

It will be also recognized that the feeding unit of the present invention does not cause any significant increase in the bulkiness of the case feeding unit as compared to the prior case feeding units. In fact, the duration of automatic operation which lasts twice as long as conventional case feeding units is achieved by utilizing the space in front of the entrance side of the feeding magazine for positioning the loading platform and transferring mechanism. This space was necessary in prior case feeding units as well in order to enable the manual introduction of case stacks through the entrance side by the operator.

While the present invention has been particularly shown and described with reference to a preferred embodiment, it will be readily apparent to those of ordinary skill in the art that various changes and modifications may be made therein without departing from the spirit and scope of the invention. It is intended that the appended claims be interpreted as including the foregoing as well as various other such changes and modifications.

What is claimed is:

1. A case-feeding unit for use in conjunction with an automatic apparatus for packaging manufactured articles into cases, the case feeding unit comprising:

a feeding magazine having vertical holding walls and arranged to house a plurality of cases disposed vertically in the form of a stack;

case separation means positioned adjacent to a lower end of the feeding magazine for removing a single case from said stack;

a base platform adapted to receive a new case stack of a predetermined height;

transferring means operating adjacent to said base platform for introducing the new case stack into the feeding magazine by engaging only one side of the new case stack and horizontally moving in a sliding motion said new case stack through an entrance side of said magazine defined between said holding walls; and sensor means associated with said feeding magazine for actuating said transferring means when the height of said stack in said magazine falls below a predetermined level.

2. The case-feeding unit as claimed in claim 1, wherein associated with said base platform is at least one vertical abutment wall formed as an extension of one of said vertical holding walls of said feeding magazine.

3. The case-feeding unit as claimed in claim 1, further comprising retaining means for retaining said case stack in its proper position in said feeding magazine, said retaining means being selectively movable between a rest condition, wherein said retaining means is laterally spaced away from said entrance side of said feeding magazine to enable access of said new case stack into said feeding magazine, and an operating condition, wherein said retaining means is moved adjacent to said entrance side to stabilize the positioning of said case stack within said feeding magazine.

4. The case-feeding unit as claimed in claim 3 wherein said retaining means comprises at least one vertical abutment bar selectively movable between said rest and operating conditions.

5. The case-feeding unit as claimed in claim 4, wherein said abutment bar is fastened to an auxiliary arm pivotally mounted and movable in response to actuation of an auxiliary actuator to move said abutment bar between its rest and operating conditions.

6. The case-feeding unit as claimed in claim 1, wherein said transferring means comprises at least one vertically extending pusher member having a height at least substantially equal to the predetermined height of said new case stack and selectively movable between a first position, wherein said pusher member is spaced away from said entrance side of said feeding magazine, and a second position, wherein said pusher member is disposed adjacent to said entrance side to abut and move said new case stack into said feeding magazine.

7. The case-feeding unit as claimed in claim 6, wherein said pusher member is fastened to a movement arm pivotally mounted about a vertical support member and movable upon activation of at least one fluid-operated actuator.

8. The case-feeding unit as claimed in claim 7, wherein said movement arm has at least one extension portion extending transversely in cantilevered fashion from the movement arm in the direction of the feeding magazine and to which said pusher member is connected.

9. The case-feeding unit as claimed in claim 7, wherein said movement arm is fastened to said pusher member at a mid-section of said pusher member measured in the longitudinal direction.

10. The case-feeding unit as claimed in claim 6, wherein said pusher member comprises at least one central support bar and a plurality of contact rollers rotatably engaged along said central support bar in a mutually superposed relation.

11. The case-feeding unit as claimed in claim 10, wherein said contact rollers impinge upon said new case stack to move said new stack through said entrance side of said magazine and into abutment with at least one vertical holding wall of said magazine.

12. A method of automatically feeding cases into an automatic apparatus for packaging manufactured articles into cases, said method comprising the following steps:
   introducing into a feeding magazine a plurality of cases disposed in the form of a stack and extending vertically in the magazine;
   individually separating the cases from the bottom of said stack and removing individual separated cases;
   arranging a new case stack on a base platform positioned in front of an entrance side of said feeding magazine; and
   engaging only one side of the new case stack and horizontally displacing said new case stack through said entrance side by sliding motion so as to introduce said new case stack into said feeding magazine when the height of said stack in said feeding magazine falls below a predetermined level.

13. A case-feeding unit for use in conjunction with an automatic apparatus for packaging manufactured articles into cases, the case feeding unit comprising:
   a feeding magazine having vertical holding walls and arranged to house a plurality of cases disposed vertically in the form of a stack;
   case separation means positioned adjacent to a lower end of the feeding magazine for removing a single case from said stack;
   a base platform adapted to receive a new case stack of a predetermined height;
   transferring means operating adjacent to said base platform for introducing the new case stack into the feeding magazine by horizontally moving said new case stack through an entrance side of said magazine defined between said holding walls, said transferring means comprising at least one vertically extending pusher member having a height at least substantially equal to the predetermined height of said new case stack and selectively movable between a first position, wherein said pusher member is spaced away from said entrance side of said feeding magazine, and a second position, wherein said pusher member is disposed adjacent to said entrance side to abut and move said new case stack into said feeding magazine, said pusher member comprising at least one central support bar and a plurality of contact rollers rotatably engaged along said central support bar in a mutually superposed relation; and
   sensor means associated with said feeding magazine for actuating said transferring means when the height of said stack in said magazine falls below a predetermined level.

14. The case-feeding unit as claimed in claim 13, wherein said contact rollers impinge upon said new case stack to move said new stack through said entrance side of said magazine and into abutment with at least one vertical holding wall of said magazine.

15. The case-feeding unit for use in conjunction with an automatic apparatus for packaging manufactured articles into cases, the case feeding unit comprising:
   a feeding magazine having vertical holding walls and arranged to house a plurality of cases disposed vertically in the form of a stack;
   case separation means positioned adjacent to a lower end of the feeding magazine for removing a single case from said stack;
   a base platform adapted to receive a new case stack of a predetermined height;
   transferring means operating adjacent to said base platform for introducing th e new case stack into the feeding magazine by horizontally moving said new case stack through an entrance side of said magazine defined between said holding walls;
   retaining means for retaining said case stack in its proper position in said feeding magazine, said retaining means being selectively movable between a rest position, wherein said retaining means is laterally spaced away from said entrance side of said feeding magazine to enable access of said new case stack into said feeding magazine, and an operating condition, wherein said retaining means is moved adjacent to said entrance side to stabilize the positioning of said case stack within said feeding magazine; and sensor means associated with said feeding magazine for actuating said transferring means when the height of said stack in said magazine falls below a predetermined level.

16. The case-feeding unit as claimed in claim 15 wherein said retaining means comprises as least one vertical abutment bar selectively movable between said rest and operating conditions.

17. The case-feeding unit as claimed in claim 16, wherein said abutment bar is fastened to an auxiliary arm pivotally mounted and movable in response to actuation of an auxiliary actuator to move said abutment bar between its rest and operating conditions.

* * * * *